United States Patent [19]

Tanaka et al.

[11] Patent Number: 4,559,573
[45] Date of Patent: Dec. 17, 1985

[54] MAGNETO-OPTICAL RECORDING MEDIUM

[75] Inventors: Shinsuke Tanaka, Kamakura; Fujio Tanaka, Tokyo; Yasuyuki Nagao, Hoya; Nobutake Imamura, Tokyo; Chuichi Ota, Fuchu, all of Japan

[73] Assignee: Kokusai Denshin Denwa Kabushiki Kaisha, Tokyo, Japan

[21] Appl. No.: 440,299

[22] Filed: Nov. 9, 1982

[30] Foreign Application Priority Data

Nov. 10, 1981 [JP] Japan ............... 56-178971

[51] Int. Cl.$^4$ .................................. G11B 23/00
[52] U.S. Cl. ............................. 360/131; 365/122; 428/623; 428/900
[58] Field of Search .............. 360/131, 134–135, 360/59; 428/900, 694, 692; 365/121, 122

[56] References Cited

U.S. PATENT DOCUMENTS

| | | | |
|---|---|---|---|
| 4,307,156 | 12/1981 | Yanagisawa | 360/135 X |
| 4,390,600 | 6/1983 | Ohta et al. | 428/694 X |
| 4,414,650 | 11/1983 | Ohta et al. | 365/121 X |
| 4,464,437 | 8/1984 | Wille et al. | 428/692 X |
| 4,467,383 | 8/1984 | Ohta et al. | 360/131 |

*Primary Examiner*—John H. Wolff
*Attorney, Agent, or Firm*—Robert E. Burns; Emmanuel J. Lobato; Bruce L. Adams

[57] ABSTRACT

A magneto-optical recording medium having an easy axis of magnetization in a direction perpendicular to the film surface, characterized in that a readout medium layer, a reflection layer and a recording medium layer are sequentially disposed in a direction of the incidence of a reading-out light, thereby to increase a reproduced output.

7 Claims, 11 Drawing Figures

MAGNETO-OPTICAL RECORDING MEDIUM

BACKGROUND OF THE INVENTION

The present invention relates to a magneto-optical recording medium for use in a magneto-optical memory, a magnetic record display element and so forth and, more particularly, to a magnetic thin film recording medium which has an easy axis of magnetization in a direction perpendicular to the film surface and permits recording of information by forming an inverted magnetic domain of a circular or arbitrary configuration and reading-out of the information through utilization of the magnetic Kerr effect or like magneto-optical effect.

With ferromagnetic thin films having the easy axis of magnetization in a direction perpendicular to the film surface, it is possible to form small inverted magnetic domains which have a polarity reversal from a uniform magnetication polarity in the film surface uniformly magnetized with an S or N pole. By making the presence and absence of the inverted magnetic domains correspond to "1" and "0", respectively, such ferromagnetic thin films can be used as a high density magnetic recording medium. Of such ferromagnetic thin films, thin films which have a large coercive force at a room temperature and has the Curie point or a magnetic compensation temperature relatively close to a room temperature permit recording of information by forming inverted magnetic domains at arbitrary positions with a light beam through utilization of the Curie point or a magnetic compensation temperature, and they are generally used as beam addressable files.

Conventionally known ferromagnetic thin films which have an easy axis of magnetization in a direction perpendicular ular to the film surface and can be used as a beam addressable file are polycrystalline metal thin films represented by MnBi, amorphous metal thin films, such as Gd-Co, Gd-Fe, Tb-Fe, Dy-Fe, etc., and compound single crystal thin films represented by GIG; however, they have such merits and demerits as described below. The polycrystalline metal thin films which utilize the Curie point for writing, represented by MnBi, are excellent in that they have a large coercive force of several kilooersteds at a room temperature, but defective in that they call for large energy for writing because of their high Curie point ($T_c = 360°$ C. in MnBi). Furthermore, since polycrystalline metals are used, these thin films must be formed to have a stoichiometric composition and this introduces technical difficulties in their fabrication. The amorphous metal thin films which perform a writing operation through utilization of the magnetic compensation point, such as Gd-Co and Gd-Fe, possess advantages in that they can be formed on an arbitrary substrate since amorphous materials are used, and that their magnetic compensation temperature can be freely controlled to some extent by the addition of a small amount of impurity, but these thin films have a shortcoming such that their coercive force at room temperature is small (300 to 500 Oe), resulting in recorded information being unstable. In addition, it is necessary, for the fabrication of the thin films of such a small coercive force, to control their composition within 1 atom%, and hence these thin films are not easy in terms of manufacture.

The compound single crystal thin films, represented by GIG, have a serious defect of very high manufacturing costs as compared with other thin films.

The amorphous alloy thin films containing 15 to 30 atoms% of Tb or Dy, such as TbFe and DyFe, which have been proposed as new magnetic thin film recording media free from such defects as described above, possess the following merits:

(1) Since they have an easy axis of magnetization in the direction perpendicular to the film surface and have a large coercive force of several kilooersteds at a room temperature, information can be recorded with high density and the recorded information is very stable.

(2) The coercive force is large and magnetic domains of desired configuration can be stored.

(3) Since they have a large coercive force over a wide range of composition and have excellent characteristics as recording media in a wide range of composition, they need not be severely restricted in composition and can be readily fabricated with a good yield rate.

(4) Since the Curie point is as low as 120° C. in the TbFe and 60° C. in the DyFe, the thermal writing operation utilizing the Curie point can be effected with very small energy.

However, the amorphous alloy thin films, such as the Tb and the DyFe, have the following drawbacks: Namely, it is true that a low Curie point permits a writing operation with small energy, but it impairs an signal-to-noise ratio (S/N) in reading out information by light. This is a very serious defect when these recording media are used as a photomagnetic memory.

A GdTbFe ternary amorphous thin film, developed as a solution to this defect, have, to some extent, the advantages of both the TbFe with excellent recording characteristics and the GdFe with excellent optical reproducing characteristics.

These structures are capable of improving to some extent the recording and reproducing characteristics as compared with the single-layer media but they are not satisfactory.

BRIEF SUMMARY OF THE INVENTION

It is an object of the present invention to provide a magneto-optical recording medium which achieves the compatibility of recording and reproducing in a higher sense.

In accordance with the present invention, there is provided a magneto-optical recording medium having an easy axis of magnetization in a direction perpendicular to the film surface, characterized in that a readout medium layer, a reflection layer and a recording medium layer are sequentially disposed in a direction of the incidence of a reading-out light, thereby to increase a reproduced output.

BRIEF DESCRIPTION OF THE DRAWINGS

The present invention will be described in detail below in comparison with conventional arts with reference to the accompanying drawings, in which.

DETAILED DESCRIPTION

For ready understanding of the present invention, conventional arts will first be described.

Figure 1:
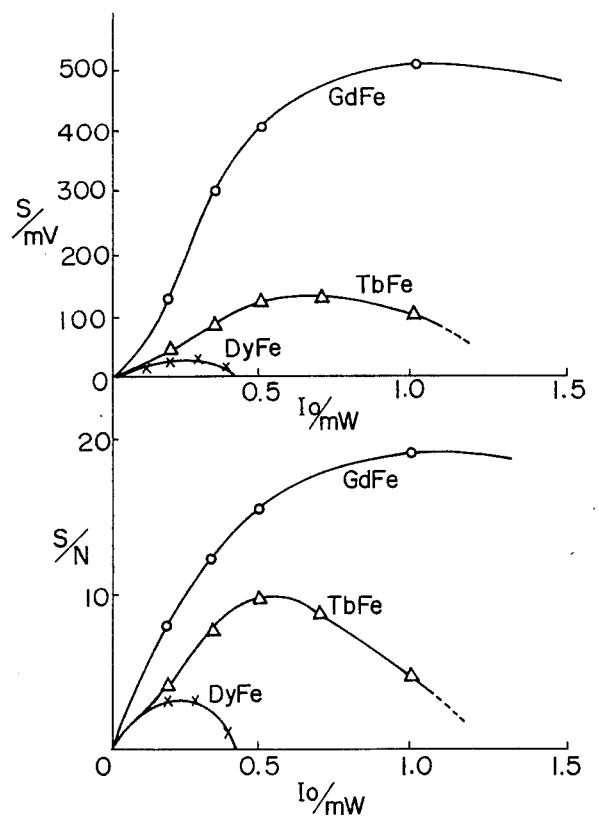
FIG. 1 is a graph showing an optically reproduced output and a singal-to-noise ratio during the optical reproducing of an amorphous ally thin film.

In FIG. 1, an optically reproduced output (S) and the signal to noise ratio (S/N) of the amorphous alloy thin film during optical reproducing are shown as functions of irradiated laser power ($I_0$) and, from FIG. 1, it is seen that the TbFe and DyFe having excellent characteristics as recording media are inferior in terms of optical reproduction to the GdFe which is not a good recording medium. This is a very serious defect when these recording media are used as a photomagnetic memory.

Figure 2:
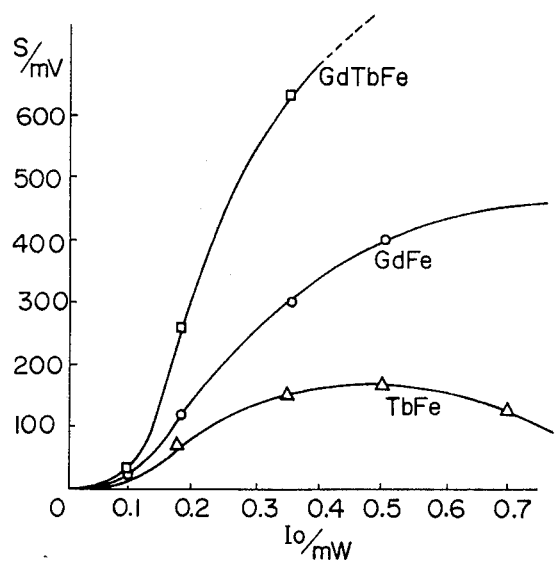
FIG. 2 is a graph showing optical reproduced output characteristics of a GdTbFe ternay system amorphous thin film and a TbFe and GdFe binary system amorphous thin films.

A GdTbFe ternary amorphous thin film, developed as a solution to this defect, have, to some extent, the advantages of both the TbFe with excellent recording characteristics and the GdFe with excellent optical reproducing characteristics. The Curie point and the coercive force of this thin film are intermediate between those of the TbFe and the GdFe. In this case, its optical reproduced output (S) is not simply intermediate between those of the TbFe and the GdFe but larger than that of the GdFe as shown in FIG. 2.

Figure 3:
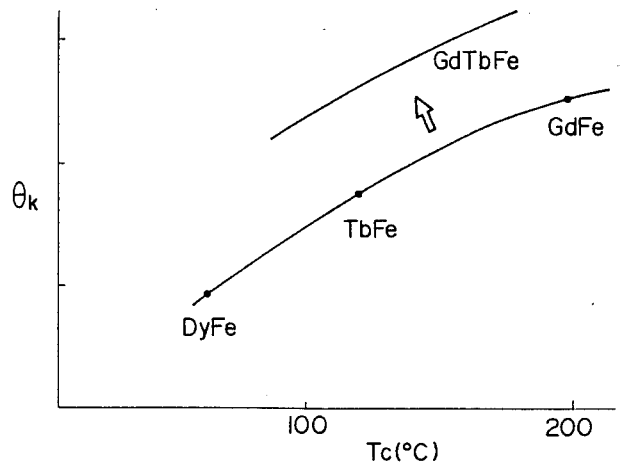
FIG. 3 is a graph showing the relationship between the Curie point and the Kerr rotational angle.

The magneto-optical recording medium is required to be excellent both in recording characteristic and in reproducing characteristic. A low Curie point and a large coercive force are needed for the former and a large Kerr rotational angle for the latter. FIG. 3 shows the relationship between the Curie point Tc and the Kerr rotational angle $\theta_k$. In conventional binary system compounds, these requirements are inconsistent and no media are obtainable which satisfy the both requirements and, accordingly, it has been desired to lower the Curie point on one hand and to increase the Kerr rotational angle on the other hand, that is, to make improvement in the direction indicated by the arrow in FIG. 3. The GdTbFe ternary system compound has been proposed as a medium which meets with such a requirement; also in this case, however, the lowering of the Curie point by increasing the rate of the Tb for improving the recording characteristic causes a decrease in the Kerr rotational angle. Accordingly, it has been a problem unsolved to lower the Curie point without reducing the Kerr rotational angle.

Figure 4A:
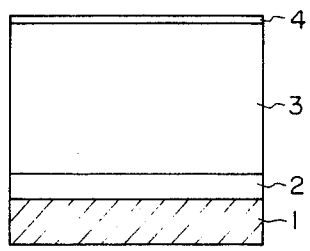
FIG. 4A and 4B are sections illustrating improved examples of conventional arts.
Figure 4B:
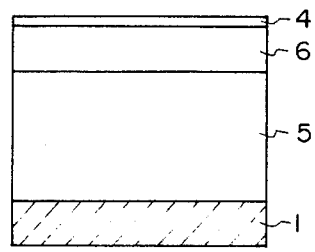

A construction which is considered to satisfy the contradictory requirements is such, for instance, as shown in FIG. 4A in which a metal film 2 of excellent reflection factor, such as silver or the like, is formed on the opposite side to a light receiving surface of a recording medium 3. This is based on such an idea that since a reproducing beam having passed through the recording medium 3 is reflected by the metal film 2 for an output, the Faraday effect is added to the Kerr effect to increase the apparent rotational angle, thereby to improve the SN ratio. Moreover, such a construction as shown in FIG. 4B is also considered in which a recording medium layer 5 of excellent recording characteristics and a readout medium layer 6 of excellent reproducing characteristics are formed one on the other as independent two layers. With such a construction, information recorded by a light beam in the recording medium 5 of low Curie point is transferred to the readout medium layer 6 of large Kerr rotational angle and read out by a light beam.

These structures are capable of improving to some extent the recording and reproducing characteristics as compared with the single-layer media but they are not satisfactory.

With reference to the accompanying drawings, the present invention will hereinafter be described in detail.

Figure 5:
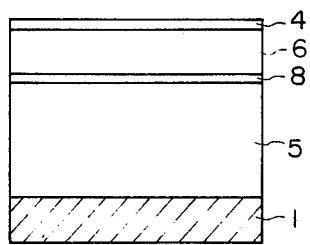
FIG. 5 is a cross-sectional view illustrating an embodiment of the present invention.

FIG. 5 illustrates an embodiment of the present invention. Reference numeral 1 indicates a substrate as of glass; 5 designates a recording medium layer of excellent recording characteristic; 8 identifies a reflection film formed by a metal thin film as of silver, copper, aluminum, gold or the like of good thermal conduction and electrical conduction; 6 denotes a readout medium layer of excellent optical reproducing characteristic; and 4 represents a protection film formed of $SiO_2$ or the like for protecting the medium.

In the magneto-optical recording medium of the present invention, the reflection film layer 8 is important. This layer has such three functions as follows:

(i) During readout it reflects back light having passed through the readout medium layer 6, so that the Faraday effect produced by the passage of the light through the readout medium layer 6 is added to the Kerr effect, increasing the intensity of the optically reproduced output.

(ii) During recording it transmits, by thermal conduction, to the recording medium layer 5 heat generated by a recording laser beam.

(iii) It transfers information recorded on the recording medium layer 5 to the readout medium layer 6 by a magnetic interaction.

Figure 6:
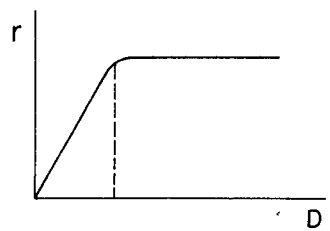
FIG. 6 is a graph showing the relationship between the thickness of a metal thin film for use in the present invention and the reflection factor thereof.
Figure 7:
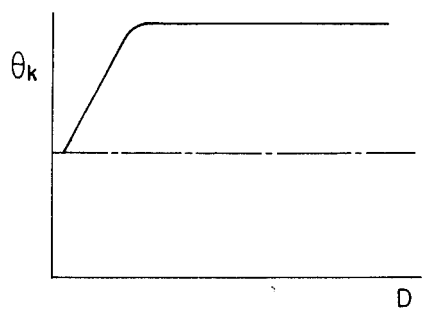
FIG. 7 is a graph showing the relationship between the thickness of the metal film used in the present invention and the Kerr rotational angle.

Since the reflection factor of the metal thin film 8 increases with an increase in its thickness D to some extent as shown in FIG. 6, it is desired, for heightening the effect (i), that the reflection film 8 used in the present invention be of such a thickness as maximizes its reflection factor r. FIG. 7 shows an increase in the Kerr rotational angle $\theta_k$ with an increase in this reflection factor. On the other hand, since the thermal conduction and the magnetic interaction mentioned above in (ii) and (iii) are considered to decrease with an increase in the thickness of the reflection film 8, it is not preferable in this sense that the thickness of the reflection film 8 is so large.

Accordingly, a desirable film thickness is designed taking into account the functions referred to previously in (i), (ii) and (iii) according to the working conditions.

In general, the magneto-optical recording medium encounters problems in reproducing rather than in recording and, in this sense, it is the most important problem to raise the intensity of the optically reproduced output. A primary object of the present invention is also to increase the intensity of the optically reproduced output by the effect mentioned previously in (i). Therefore, it is a problem how to maintain the effects of (ii) and (iii) in the region in which the reflection factor is maximum. The effect of (ii) is premised on using a metal of good thermal conduction, such as Ag, Cu, Au, Al or the like, for the reflection film 8. In view of the diameter of the recording beam (2 to 3 μm) and a 0.05 μm film thickness at which the reflection factor is saturated, the problem of lowering of thermal conduction to the recording medium layer 5 is almost negligible in practice. It is the reduction of the magnetic interaction by the reflection film 8 that poses a problem.

Figure 8:
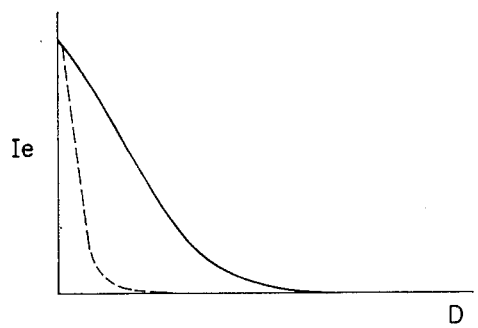
FIG. 8 is a graph showing the relationship between the thickness of a non-magnetic layer and the magnitude of an exchange interaction between magnetic layers.

When two magnetic layers are formed one on the other, the directions of magnetization of the both layers tend to become the same mainly owing to an exchange interaction, but when a non-magnetic layer of an insulator as of $SiO_2$ is interposed between these two layers, the exchange interaction Ie sharply decreases with an increase in the thickness D of the non-magnetic layer as shown in FIG. 8. However, in case of a conductor even if it is non-magnetic, the so-called s-d interaction and s-f interaction exist by which spinning takes place in the same direction using conduction electrons as media and, as a result of this, the lowering of the exchange interaction relative to the film thickness is less than in case of the insulation layer as indicated by the solid line in FIG. 8. In the case of the present invention, since Ag, Cu, Au, Al or the like which are abundant in conduction electrons is used for the non-magnetic layer as referred to above, the effects of the s-d interaction and the s-f interaction are particularly marked, and hence it is expected that the lowering of the exchange interaction by this layer can be appreciably avoided.

Figure 9A:
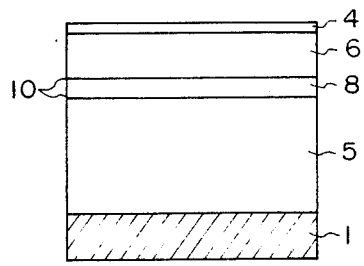
FIGS. 9A and 9B are cross-sectional views illustrating other embodiments of the present invention.

For further suppressing the reduction of the interaction, a region 10 in which atoms of a magnetic layer and the non-magnetic layer are mixed is provided in the interface between the both layers in the course of manufacture or by heat treatment after the manufacture as shown in FIG. 9A and this region has magnetism and increases the interaction without affecting the reflection factor and the thermal conductivity. The mixed region 10 which has magnetism is formed by, for example, GdAg. When to minimize the reduction of the interaction, it is also possible to form the reflection layer 10 by only a layer in which magnetic and non-magnetic materials are mixed as shown in FIG. 9B.

Figure 9B:
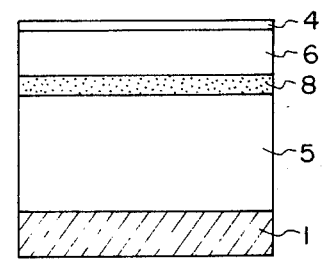

Furthermore, in a case where even if the interaction is somewhat reduced, no trouble occurs in practice and importance is attached to increase the intensity of the reproduced output, the reflection film 8 is formed by a metal thin film as of silver, copper, aluminum, gold or the like as in the embodiment of FIG. 5; conversely, in a case where the reproduced output need not so large but an appreciable reduction of the interaction is not desirable, the structure such as previously described in respect of the embodiment of FIG. 9A or 9B. Besides, it is as described previously that the thickness of the reflection film 8 can be changed for the same effects as mentioned above.

The magneto-optical recording medium of the present invention is formed by sputtering, vacuum evaporation or the like on a substrate held below a room temperature. Such a multilayer structure can easily be obtained by controlling with time the RF power of each target in the case of the sputtering method and the temperature of an evaporation source in the case of the vacuum evaporation method.

As has been described in detail in the foregoing, the magneto-optical recording medium of the present invention is excellent in both recording and reproducing characteristics by the provision of a recording medium layer and a readout medium layer independently of each other and the provision of a reflection film therebetween.

What we claim is:

1. A magneto-optical memory medium comprising: a substrate, a magneto-optical readout medium layer having an easy axis of magnetization perpendicular to its surface and provided on said substrate, a reflector medium layer adjacent to and in contact with said readout medium layer, and a magneto-optical recording medium layer having an easy axis of magnetization perpendicular to its surface and provided adjacent to and in contact with the reflector medium layer, the reflector medium layer having good thermal and electrical conduction characteristics so that when light is applied for information reproduction, the light passes through said readout medium layer to said reflector medium layer and is reflected back to said readout medium layer for use in enhancing an optically reproduced output.

2. A magneto-optical memory medium according to claim 1, in which the reflector medium layer is metallic effective so that the Faraday effect produced by the passage of the light through the readout medium layer is added to the Kerr effect increasing the intensity of the optically reproduced output.

3. A magneto-optical memory medium according to claim 2, in which the metal of said metallic reflector medium layer is selected to effectively transmit by thermal conduction heat to the recording medium layer generated by application of a recording laser beam to the magneto-optical memory medium.

4. A magneto-optical memory medium according to claim 2, in which the metal of the metallic reflector medium layer is effective to transfer information recorded on the recording medium layer to the readout layer by magnetic interaction.

5. A magneto-optical memory according to claim 4, in which the thickness of the reflector medium layer is of a thickness selected to maximize its reflector factor r and the thickness being selected to effectively maintain said magnetic interaction and effective heat conduction thereby.

6. A magneto-optical memory medium according to claim 1, in which said reflector medium layer is made of a metal selected from the group silver, copper, aluminum or gold.

7. A magneto-optical memory medium according to claim 1, in which said reflector medium layer is made of an alloy of a magnetic substance and a non-magnetic substance.

* * * * *